C. LE G. FORTESCUE.
TRANSFORMER.
APPLICATION FILED AUG. 7, 1911.

1,227,415.

Patented May 22, 1917.

WITNESSES:
Fred H Miller

INVENTOR
Charles Le G Fortescue
BY
Kelley & Carr
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC AND MANUFACTURING COMPANY, A CORPORATION OF PENNSYLVANIA.

TRANSFORMER.

1,227,415.     Specification of Letters Patent.     Patented May 22, 1917.

Application filed August 7, 1911. Serial No. 642,876.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Transformers, of which the following is a specification.

My invention relates to electrical apparatus and particularly to polyphase transformers.

The object of my invention is to provide a particularly simple and inexpensive three-phase transformer which shall be so arranged and proportioned as to utilize its magnetizable core member to a maximum extent.

According to my invention, the magnetizable core members of polyphase transformers may be worked at uniform flux densities throughout. This permits of a very efficient construction for transformers because each portion of the magnetizable core members will be worked at the same maximum flux density, thereby requiring a minimum amount of material for the core structures. Again, the iron losses are minimized by reason of the core members having no portions that are worked either at extremely high or low, and, consequently, inefficient flux densities. By embodying my invention in transformer structures, I provide transformers which operate at high efficiencies, and which, at the same time, require considerably less material than heretofore utilized in polyphase transformers of similar capacities.

Figure 1:
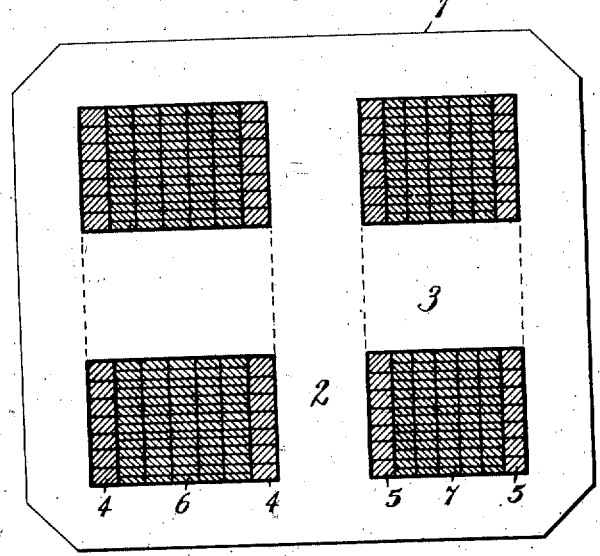
Figure 2:
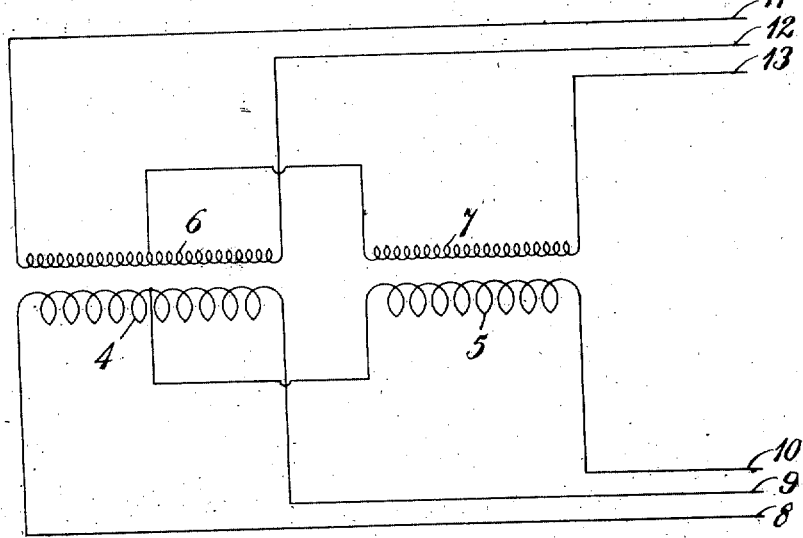

Figure 1 of the accompanying drawings is an elevation of a transformer arranged in accordance with my invention, the coils being shown in cross section. Fig. 2 is a diagrammatic view showing the circuit connections for the coils shown in Fig. 1.

Referring to the drawings, the three-phase T-connected transformer here shown comprises a core member having an outer rectangular portion 1, and a central cruciform portion composed of legs 2 and 3, secondary windings 4 and 5 and primary windings 6 and 7.

I propose to use the well known Scott transformer connection in my transformer in order that advantage may be taken of the phase difference in the fluxes generated by the T-connected windings. The active length of the windings 4 and 6 may be considered as being 100 per cent. Then, to secure terminal voltages having proper values and proper mutual phase differences, the active lengths of the windings 5 and 7 must be 86.6 per cent. This relationship between the active lengths of the windings comprising the Scott connection is well known in the art.

The primary coil windings 4 and 6 are disposed in one set of openings in the core member of my transformer, and, similarly, the secondary coil windings 5 and 7 are disposed in the other set of openings in the same core. I desire to have the dimensions of one pair of sides of the core openings equal, as shown in Fig. 1. Consequently, the dimensions of the other pair of sides of the core openings are in the ratio of 100:86.6 because of the aforementioned ratio between the active lengths of the respective windings. By apportioning the insulation for the windings 5 and 7, and choosing a proper dimension for the copper conductors thereof, the above-mentioned ratio may be approximated and defined as being 10:8. However, it will be understood that, if the windings were similar and differed only in their active lengths, the ratio between the sides of the respective core openings would be 100:86.6, but, for convenience, I, have modified the structure so as to change the said ratio to 10:8.

Equal quantities of flux are generated by the energization of the windings 4—6 and the windings 5—7. Therefore, the cross sectional area of the leg 3, which carries all the flux is twice that of the core portion 1 which carries one-half of the flux by reason of the flux dividing into two equal portions at the junction between the core leg 3 and the portion 1 of the core. Inasmuch as the flux generated by the energization of the coils 4 and 6 is equal to, and 90 degrees displaced in phase from, the flux generated by the coils 5 and 7, the resultant flux flowing in the core leg 2 is substantially equal to 1.4 times that flowing in the core portion 1. In order to insure that each portion of the core is worked at the same flux density throughout, the cross-sectional area of the core leg 2 is substantially one and four tenths times that of the portion 1, and the cross-sectional area of the leg 3 is substantially twice that of the portion 1. For convenience in construction, the leg 3 of the cruciform portion may be divided in length by the leg 2 substantially in the ratio of 10:8, and the turns of the coils 4 and 5 and 6 and 7 bear substantially the same ratio to each other and surround the portions of the core leg 3 to which they correspond.

As shown in Fig. 2, one terminal of the winding 5 is connected to the middle point of the winding 4 and the corresponding terminal of the winding 7 is connected to the middle point of the winding 6, the terminals of the winding 4 and the free terminal of the winding 5 constituting three-phase points which may be connected to circuit conductors 8, 9 and 10. The terminals of the windings 6 and 7 are similarly connected to circuit conductors 11, 12 and 13.

The circuit connections shown in Fig. 2 of the drawing and specified in the preceding paragraph are well known three-phase connections for a transformer having two primary and two secondary windings.

I claim as my invention:

1. A three-phase T-connected transformer comprising a core member having an outer portion and a central cruciform portion, and coils divided between the two parts of one of the cruciform core legs substantially in the ratio of 8:10.

2. A three-phase T-connected transformer comprising an outer rectangular core portion and a cruciform inner portion, the cross sectional area of one of the legs of the cruciform portion being substantially twice that of the outer portion, and the cross sectional area of the other leg being substantially one and four tenths that of the outer portion, and coils mounted on two parts of one of the core legs.

3. A three-phase T-connected transformer comprising an outer rectangular core portion and a cruciform inner portion, the cross sectional area of one of the legs of the cruciform portion being substantially twice that of the outer portion, and the cross sectional area of the other leg being substantially one and four tenths that of the outer portion, and coils divided between the two parts of one of the cruciform core legs substantially in the ratio of 8:10.

4. A three-phase transformer comprising a core member having an outer rectangular portion and a central cruciform portion, one leg of the cruciform portion dividing the other substantially in the ratio of 8:10 and the cross sectional area of one of the cruciform core legs being substantially twice that of the outer portion, and the cross sectional area of the other leg being substantially one and four tenths that of the outer portion, and coils located on the parts of the core which are divided in the ratio of 8:10, the turns of the coils bearing substantially the same ratio to each other as the parts of the core on which they are located.

In testimony whereof, I have hereunto subscribed my name this 31st day of July, 1911.

CHARLES LE G. FORTESCUE.

Witnesses:
R. J. DEARBORN,
B. B. HINES.